United States Patent

Procop et al.

[15] 3,704,065
[45] Nov. 28, 1972

[54] SINGLE FRAME ADVANCE MECHANISM FOR PICTURE PROJECTORS

[72] Inventors: Alex J. Procop; Ace Boultinghouse, both of Northridge, Calif.

[73] Assignee: Edutek Systems Corporation

[22] Filed: July 2, 1971

[21] Appl. No.: 159,432

[52] U.S. Cl. .................352/169, 352/177, 352/178
[51] Int. Cl. .......................................G03b 21/38
[58] Field of Search.......352/169, 176, 177, 178, 179

[56] References Cited

UNITED STATES PATENTS 3,397,937  8/1968  Schrader ...................352/169
3,025,752  3/1962  Kaden .......................352/169

Primary Examiner—Samuel S. Matthews
Assistant Examiner—Monroe H. Hayes
Attorney—Wood, Herron & Evans

[57] ABSTRACT

A mechanism for motion picture projectors and the like for advancing a strip of film one frame at a time. A brake mechanism is tripped by a pin located upon one of the rotating shutter blades which then permits the brake to engage another of the shutter blades to stop its movement at a position leaving the shutter open. At the same time the mechanism disengages a clutch drive between the shutter and its drive motor so that the shutter is free running just prior to braking.

9 Claims, 7 Drawing Figures

INVENTORS.
ALEX J. PROCOP
ACE BOULTING HOUSE
BY
Lyon & Lyon
ATTORNEYS

PATENTED NOV 28 1972
3,704,065
SHEET 3 OF 3
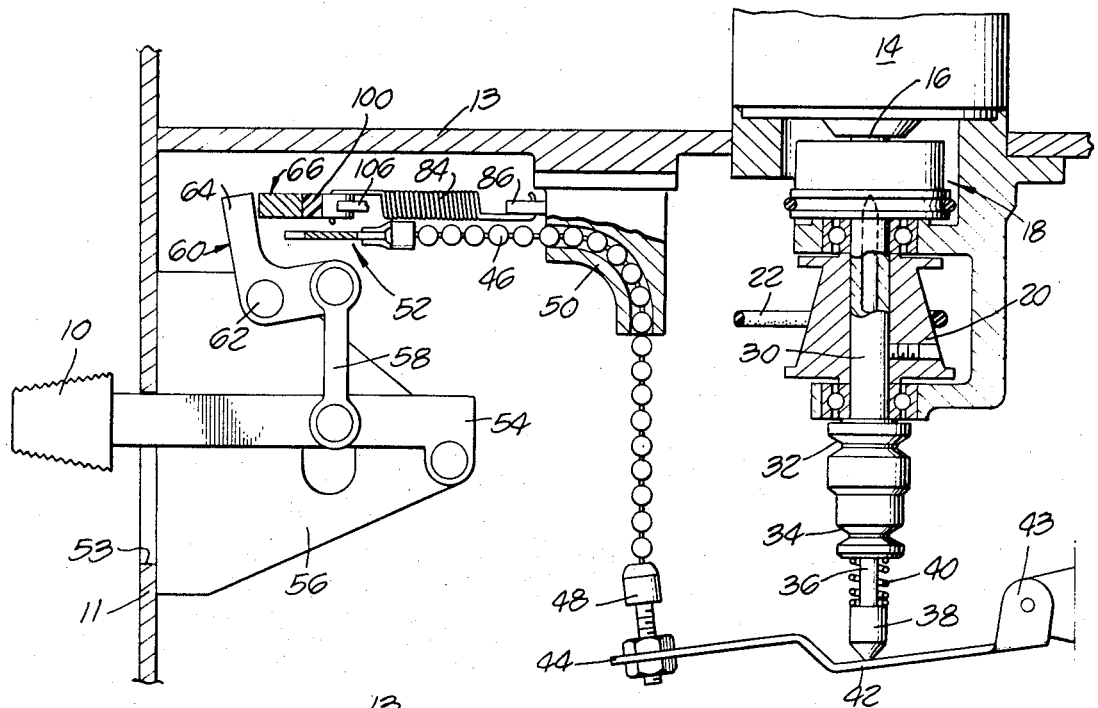
FIG. 6.
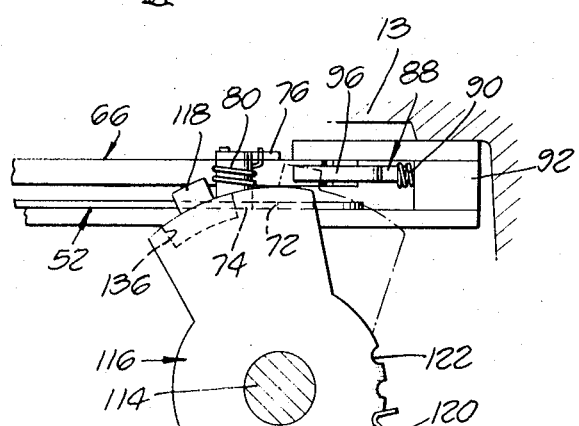
FIG. 7.
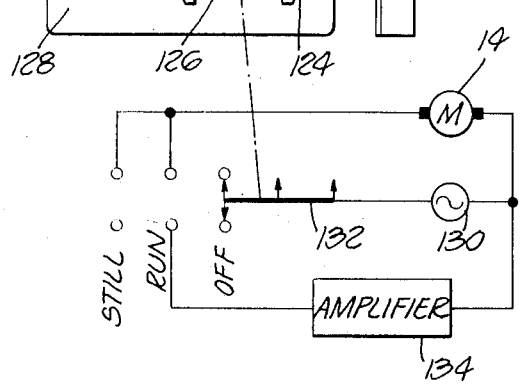
INVENTORS.
ALEX J. PROCOP
ACE BOULTING HOUSE
BY
ATTORNEYS 3,704,065

SINGLE FRAME ADVANCE MECHANISM FOR PICTURE PROJECTORS

BACKGROUND OF THE INVENTION

The present invention relates generally to motion picture projectors and, specifically, to a mechanism whereby the strip of film can be advanced one frame at a time and each such frame can be projected for a prolonged period of time. There are a great many reasons which will come to mind for having a single frame advance mechanism, particularly in those types of projectors used for demonstration purposes or educational purposes, some of which films include not only action pictures but also still frames. There are a number of projectors which have mechanisms for accomplishing this purpose and among them are the devices disclosed in the Schrader U.S. Pat. No. 3,397,937 and the Kaden U.S. Pat. No. 3,025,752. Some of the mechanisms operate to stop and advance the shutter through electrical means and some through mechanical means. The difficulty with the electrical means resides primarily in its complexity and requirement for careful adjustment. The difficulty with mechanical mechanisms heretofore developed, resides primarily in the use of a positive stop on the shutter mechanism itself which imparts unfavorable forces thereto. An example is the device shown in the above-mentioned Kaden patent which employs a stop pin on the rotating shutter disc which is engaged by a pawl which quite abruptly stops the movement of the shutter. Since the shutter is moving at full speed prior to being engaged by the pawl, it is apparent that the stop will be quite abrupt and therefore likely to damage the mechanism after prolonged use.

SUMMARY OF THE INVENTION

The present invention provides a new type of single frame advance mechanism employing a brake designed to engage only one of the several shutter blades and which is tripped and allowed to move into its engaging position by a pin situated on one of the other shutter blades. When the mechanism is actuated, it releases the clutch so that the drive line between the shutter motor and the shutter wheel is interrupted so that the shutter wheel is not driven but is, in fact, coasting prior to the braking action. In this manner, a single frame advance mechanism is provided which is positive and assures the advance of only a single frame but which is relatively simple in construction but does not require minute adjustments to assure its proper and continued operation.

It is an object, therefore, of the present invention to provide an improved single frame advance mechanism for motion picture projectors.

More specifically, it is an object of this invention to provide a single frame advance mechanism which when actuated declutches the motor drive to the shutter and then positively brakes the shutter leaving the shutter open.

Further objects and advantages of the present invention will become apparent upon reading the following detailed description in conjunction with the accompanying drawings.

DESCRIPTION OF THE DRAWINGS

FIG. 6 is a side elevation of the mechanism taken substantially along line 6—6 of FIG. 2 and showing the details of the braking and clutch mechanisms together with the association therewith of the motor drive.

FIG. 7 is an elevation showing the relationship of the selector switch portion of the mechanism and illustrating its interconnection into the electrical circuitry.

DESCRIPTION OF THE PREFERRED EMBODIMENT

Figures 1, 2:
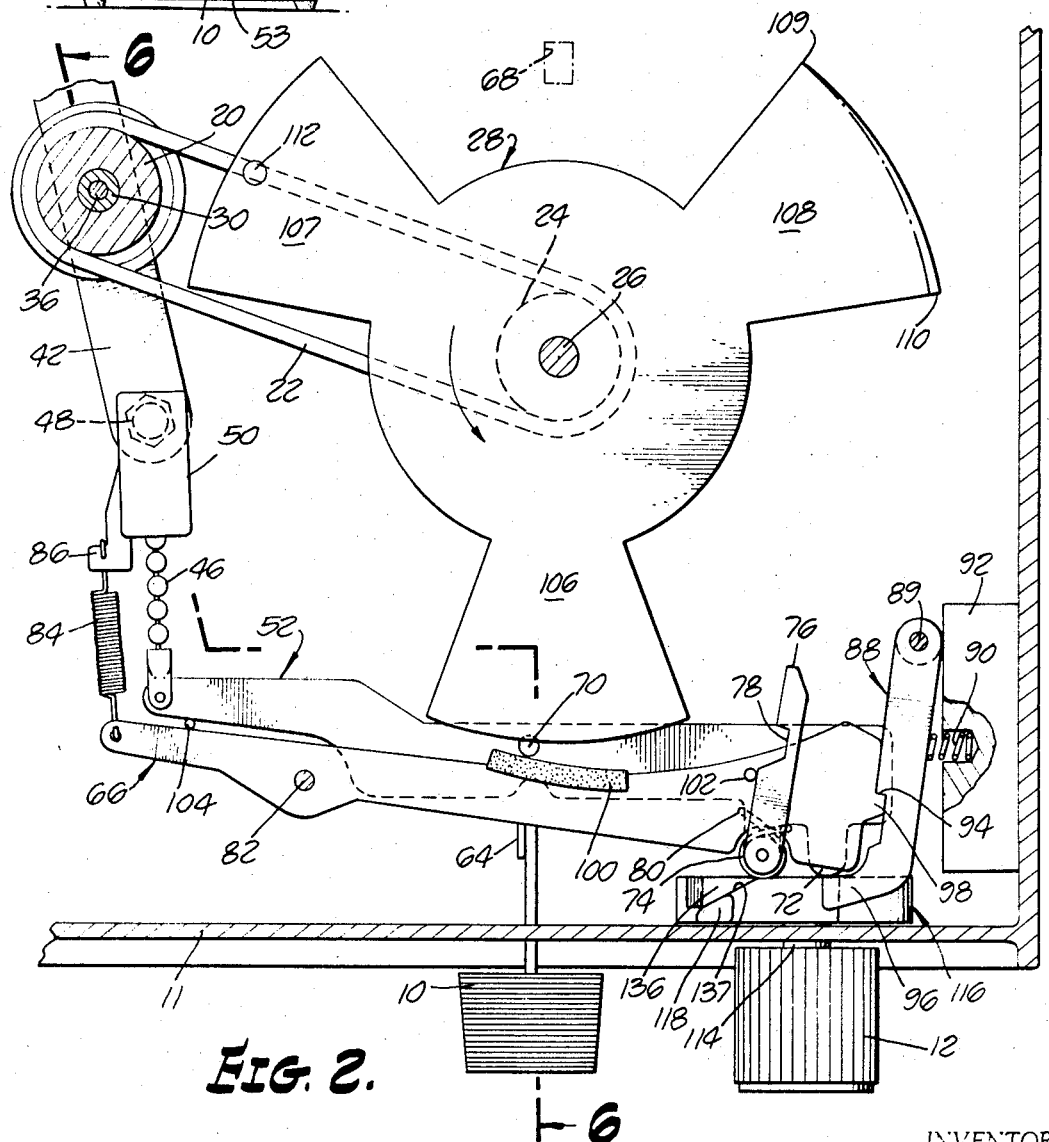
FIG. 1 is a pictorial elevation of a motion picture projector of a type employing the details of this invention, the specific configuration of which is covered by my co-pending design patent application.
FIG. 2 is an enlarged plan view of the advance mechanism in one condition thereof.

For illustrative purposes a rear screen type motion picture projector is shown in FIG. 1 having an exterior design of the type disclosed in my co-pending design patent application. On the front panel thereof seen in FIG. 1 are two controls pertinent to the present invention those being a single frame advance lever 10 and a selector switch 12. Selector switch 12 is a three position rotary switch having stations for off, run and still, the functions of which will be more readily apparent hereinafter.

Turning first to FIGS. 2 and 6, the front panel of the projector housing is designated 11 and a horizontal panel 13. Mounted upon panel 13 is a drive motor 14 the shaft 16 of which is coupled through clutch mechanism 18 to a cone-shaped pulley 20. A drive belt 22 passes over pulley 20 and over a second cone-shaped pulley 24, which is mounted by means of a shaft 26 to shutter 28. Shaft 30 extending from the clutch 18 is non-rotatably affixed to pulley 20 and may also be affixed to additional pulleys 32 and 34, which may be used to drive other portions of the system such as a film drive capstan and the like. A coaxial clutch actuating shaft 36 extends through shaft 30 and at the end thereof there is affixed a collar 38. A spring 40 is situated coaxially on shaft 36 and bears against the collar 38 biasing the end of shaft 36 downwardly in a manner which will normally tend to disengage the clutch 18. A clutch actuating lever 42 has one end 43 pivotally attached to a rigid portion of the projector housing and to the other end 44 is affixed a clutch actuating chain 46. Chain 46 is preferably attached to the end 44 of lever 42 by means of a variable adjusting means 48, whereby the actuating position of the lever 42 can be adjusted. Chain 46 extends through a right angle chain guide 50 mounted to the horizontal housing panel 13 and the other end of chain 46 is affixed to one end of the clutch lever 52.

Single frame advance lever 10 extends through an opening 53 in the panel 11 and has the opposite end 54 thereof affixed to rigid bracket 56. At a point intermediate its length, an actuating link 58 has one end affixed to advance lever 10. The other end of link 58 is pivotally affixed to an L-shaped lever arm 60, which is pivotally affixed at 62 to bracket 56. The working end 64 of lever arm 60 is adapted to bear upon the brake lever 66.

Turning now to FIG. 2, a top plan view of the brake mechanism in conjunction with the shutter 28 is seen wherein the projection aperture is shown at 68. Clutch lever 52 is mounted upon a fixed pivot pin 70 and is rotatable thereabout. To one end of lever 52 the clutch chain 46 is connected, and the other end is provided with a first ear 72 and a second ear 74. To the ear 74 is pivotally attached a trip latch 76 having a notch 78 on the left side thereof. A coil spring 80 is wrapped about the pivot end of latch 76 and one end bears against the side of ear 74 and the other against the side of latch 76 biasing the latch in a counter-clockwise direction.

The brake lever 66 is mounted for pivotal movement upon pin 82. The left hand end of lever 66 is connected to a spring 84, the other end of which is affixed to a tab 86 connected to a rigid portion of the frame or in this case it is shown connected to the chain guide 50. An interlock arm 88 is pivotally mounted at 89 to a portion of the projector frame and a spring 90 mounted in a spring receiver 92 likewise affixed to the frame, urges interlock arm 88 in a clockwise direction. Interlock arm 88 is provided with a shoulder 94 and a foot 96. Arm 88 is horizontally aligned with the end of brake lever 66, and that end of brake lever 66 is provided with a tab 98 adapted to engage the shoulder 94. In this manner, in the positions shown in FIG. 2, it will thus be seen that the interlocking of the tab 98 and the shoulder 94 prevents counter-clockwise rotation of the brake lever 66. Brake lever 66 is provided with a brake shoe or pad 100, preferably of a resilient material. A brake pin 102 is mounted upon the brake lever 66 in a position to co-act with trip latch 76. Similarly, a clutch lever stop pin 104 is mounted upon the projector frame and positioned as shown to limit movement of clutch lever 52.

The shutter wheel 28 comprises three segmental blades numbered 106, 107 and 108, respectively. These blades leave segmental projection apertures between them which serve to interrupt the image projected through the projection aperture 68 in a conventional manner. Blades 106 and 107 have a curved outer terminus having an axis of rotation located at the center of the shaft 26. Blade 108, on the other hand, has an outer terminus described by the same radius but wherein the axis is shifted away from the center of shaft 26 so that the leading corner 109 of the blade 108 is equal in radius to the length of the arms for 107 and 106, however, the trailing edge 110 is of somewhat greater dimension. On blade 107 there is mounted a shutter trip pin 112.

Figure 4:
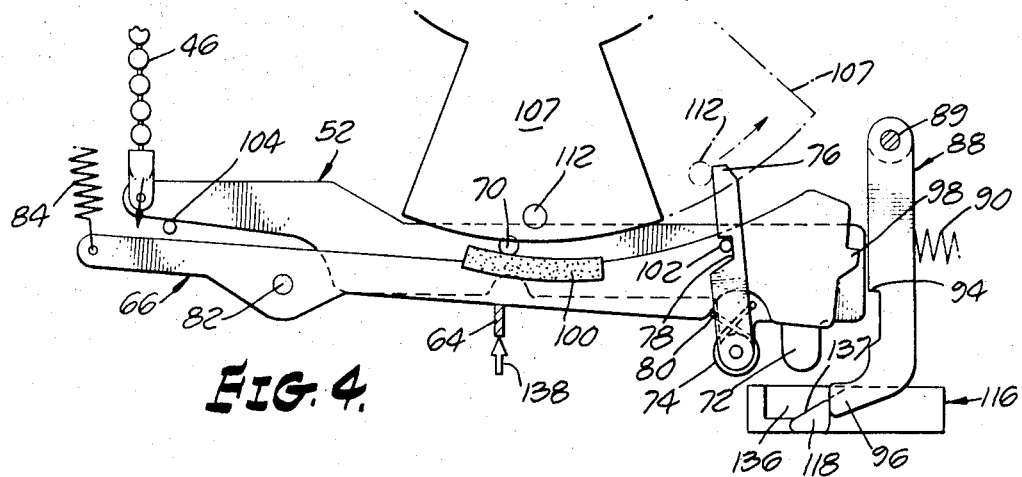
Figure 5:
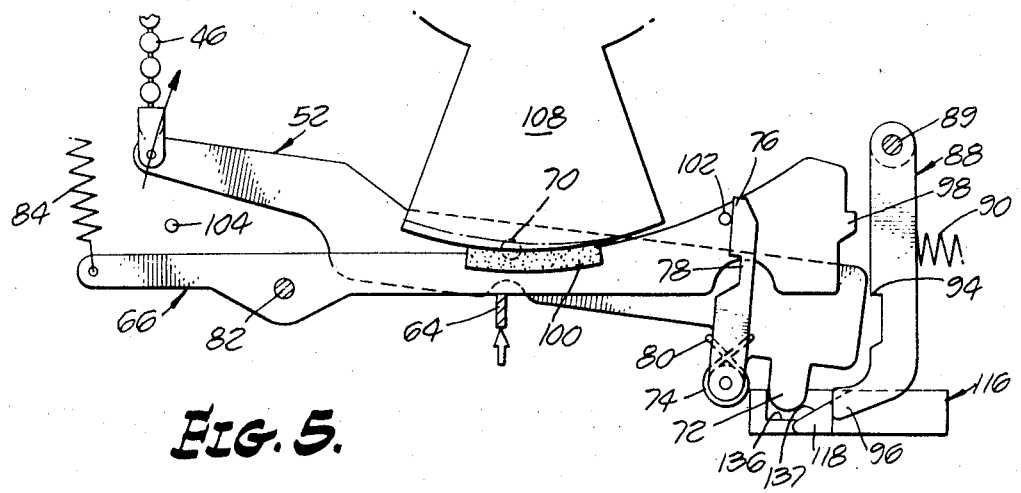

Turning now to FIG. 7, the selector 12 has a shaft 114 to which is mounted a cam 116. This cam has several functions, some of which will only become clear upon reading the description concerning the sequential operation as set forth in FIGS. 3, 4 and 5. At this point, it should be understood that rotation of the cam segment 116 clockwise will move tab 118 against the foot 96 of interlock arm 88. This occurs when the selector is turned all the way clockwise wherein the detent spring 120 will be lodged in notch 122. This corresponds to the still position and the action of tab 118 striking foot 96 disengages shoulder 94 from tab 98 releasing the brake lever 66. A fork 124 is formed also in the cam segment 116 and this fork is adapted to engage the toggle 126 of a slide switch 128 this being a three-pole, three-position switch. In the configuration shown in FIG. 7, switch toggle 126 is all the way to the right corresponding to the off position. At this point, power source 130, though connected to the sliding contact 132 of the switch, is connected to terminals to which no connections are made and therefore no power is supplied to the unit. In the second or intermediate position, power is supplied to the drive motor 14, the projector lamp (not shown) and to the sound amplification means 134. In the third or still position, power is supplied only to motor 14 and the lamp, as there is no sound to be picked up from a stationary single frame of film; thus the motor remains running in the still position, driving the fan for cooling. The cam detent 136 will be more fully understood following the description of FIGS. 3, 4 and 5.

Figure 3:
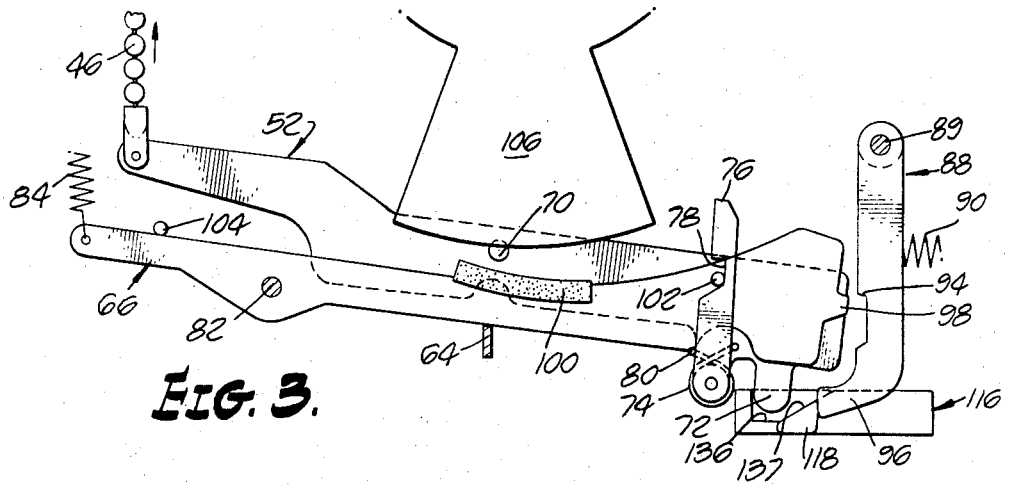
FIGS. 3, 4 and 5 represent partial plan views of the mechanism in different sequential stages of the braking operation.

FIG. 2 shows the orientation of the various parts when the selector is in either the off or the run position. In FIG. 3, the selector has been moved to the still position thereby rotating cam switch 116 so that tab 118 has moved foot 96 counter-clockwise releasing tab 98, so that now the brake lever 66 is free to move and to rotate counter-clockwise. At the same time, the rotation of cam 116 has positioned the detent 136 so that it now receives therein ear 72 thus permitting clockwise rotation of the clutch lever 52. That in turn permits the release of clutch chain 46 so that now the motor 14 is running but the clutch is disengaged. Also, the clockwise movement of the clutch lever 52 has permitted the engagement of the brake pin 102 in notch 78 of the trip latch 76. At this stage of the sequence, we shall assume that shutter blade 106 was oriented in a position closest to the brake lever 66. The clockwise rotation of the brake lever 66 is stopped by clutch stop pin 104.

Next, the advance lever 10 is actuated by pushing down thereon moving actuating arm 64 in the direction of arrow 138. This pushes upon brake lever 66 but since the brake pin 102 is lodged in notch 78 of trip latch 76, it rotates the clutch lever in a counter-clockwise direction. Counter-clockwise rotation of clutch lever 52 pulls on chain 46 to once more engage the clutch and cause the shutter wheel 28 to revolve in a counter-clockwise direction. In this manner, shutter blade 106 will move to the right when viewing FIG. 4 and shutter blade 107 will follow it. When this happens, shutter trip pin 112 will move past and contact trip latch 76, causing it to disengage itself from brake pin 102. Then, the continued forward motion on the brake lever causes the brake lever to continue to rotate in a counter-clockwise direction but as soon as latch 76 is tripped, clutch lever 52 can once more rotate in a counter-clockwise direction, which will again release the clutch so that the shutter wheel 28 is then free running. When the next shutter blade 108 arrives in the position close to the brake mechanism, the brake lever 66 will have been moved far enough, and will continue to so move under the force imparted to it by the arm 64 so that it will be in a position to engage the extremity of the blade 108. As previously described, the extremity of 108 appears to the curved surface of the brake pad 100 somewhat like a ramp, so that the braking action which takes place is a gradual one but a sure stop. It will be seen that when stopped in this position the projection aperture 68 remains open. Cam switch 118 has in the detent 136 a ramp surface 137 provided so that upon returning the selector control to either the on or off position, the ramp surface will actuate ear 72 to push inwardly thereon to rotate in a counter-clockwise manner the clutch lever 52 thereby engaging the clutch mechanism. When it is desired to further advance the film strip one frame at a time, the advance lever 10 is merely released allowing it to return to its uppermost position whereupon lever arm 64 is withdrawn permitting spring 84 to actuate the brake lever 66 returning the various parts to the positions shown in FIG. 3 except that blade 108 will remain in the juxtaposed position. Continued actuation of the lever 10 will cause the mechanism to repeatedly function in the same manner, the shutter wheel making one complete revolution each time.

It will thus be seen that a very effective mechanism has been provided for the frame by frame advancement of a strip of film, which provides a positive stop for the shutter mechanism yet stops this movement after the motor drive has been interrupted thereby preventing any shock damage to the motor drive line or the motor itself, yet providing a positive and sure stop for each single rotation of the shutter wheel. Likewise, there is little to go out of adjustment as the ramp formed on the shutter blade 108 is of substantial size sufficient to engage the brake pad 100 positively each time.

While a particular embodiment of the present invention has been shown and described, it will be obvious to persons skilled in the art that changes and modifications might be made therein without departing from this invention in its broader aspects, and it is the air, therefore, of the appended claims to cover all such changes and modifications as fall within the true scope and spirit of this invention.

We claim:
1. A motion picture projector which is adapted to selectively advance the film one frame at a time, the combination comprising:
   shutter means for intermittently interrupting the projected image, a motor for driving said shutter means, and clutch means for selectively coupling said motor to said shutter means;
   brake means for stopping said shutter means in a position not interrupting the projected image;
   first actuating means for actuating said clutch means to momentarily couple said driving motor to said shutter means and then to decouple the same;
   second actuating means to actuate said brake means after said clutch means has been decoupled; and
   means releasably connecting said first actuating means to said brake means and cooperating with said shutter to release said brake means for engagement with said shutter.

2. The combination described in claim 1 wherein said second actuating means comprises a trip link releasably interconnecting said brake means to said first actuating means, a trip pin located upon a moving portion of said shutter means, said pin being positioned to engage said trip link to release said brake means.

3. The apparatus of claim 1 wherein:
   said means releasably connecting said first actuating means to said brake means cooperates with said shutter (a) to release said brake means from said first actuating means for engagement of said brake means with said shutter and (b) to release said first actuating means from said brake means to decouple said clutch prior to engagement of said brake means with said shutter.

4. A motion picture projector which is adapted to selectively run the film continuously and to advance the film one frame at a time, the combination comprising:
   shutter means for intermittently interrupting the projected image, a motor for driving said shutter means, and clutch means for selectively coupling said motor to said shutter means;
   brake means for stopping said shutter means in a position not interrupting the projected image; said brake means including shutter engaging means operable to peripherally engage said shutter;
   first actuating means for actuating said clutch means to momentarily engage said clutch and then to disengage it;
   second actuating means to actuate said brake means after said clutch means has been disengaged; and
   selector means having at least two stations, in the first station said selector means cooperating with said first actuating means to lock said clutch in the engaged condition for continuous operation of said projection, in a second station said selector means releasing said first actuating means for momentary engagement of said clutch means and thereafter for disengagement of said clutch means prior to engagement of said shutter by said brake means.

5. The combination described in claim 4 wherein said second actuating means comprises a trip link releasably interconnecting said brake means to said first actuating means, a trip pin located upon a moving portion of said shutter means, said pin being positioned to engage said trip link to release said brake means.

6. A motion picture projector which is adapted to selectively advance the film one frame at a time the combination comprising:
   shutter means for intermittently interrupting the projected image, said shutter means having a plurality of circumferentially spaced blades defining projection apertures therebetween, a motor for driving said shutter means, clutch means coupling said motor to said shutter means for selectively disengaging said motor from said shutter;
   brake means including an enlarged end formed upon one of said shutter blades, a pivotally mounted brake lever adapted to coact with said enlarged shutter blade and resilient means mounted upon said lever to contact the end of said blade;
   clutch actuating means including a clutch lever, linkage means interconnecting said clutch lever and said brake lever; and
   actuating means including means for sequentially actuating said clutch lever whereby said clutch is first disengaged, then engaged and then disengaged again, said actuating means further including means for moving said brake lever into braking position as said clutch is disengaged the second time.

7. The combination described in claim 6 further including:

selector means having at least two stations, in the first station said selector means having means locking said actuating means in the clutch engaged condition, in a second station said selector means releasing said actuating means for activation of said clutch.

8. The combination described in claim 7 further including:

selector means having at least two stations, in the first station said selector means having locking means locking said actuating means to restrain said clutch lever and said brake lever, in a second station said selector having means releasing said clutch and brake levers.

9. The combination described in claim 6 wherein said actuating means includes a trip pin located upon one of said shutter blades, said linkage means interconnecting said clutch and brake levers being projected in the path of said pin when said actuating means is actuated to engage said clutch means.

* * * * *